United States Patent
Michiels et al.

(10) Patent No.: US 10,766,070 B2
(45) Date of Patent: Sep. 8, 2020

(54) SELF SUPPORTING IN ADDITIVE MANUFACTURING

(71) Applicant: MATERIALISE N.V., Leuven (BE)

(72) Inventors: Manuel Michiels, Leuven (BE); Gert Claes, Meeuwen-Gruitrode (BE)

(73) Assignee: Materialise N.V., Leuven (BE)

( * ) Notice: Subject to any disclaimer, the term of this patent is extended or adjusted under 35 U.S.C. 154(b) by 307 days.

(21) Appl. No.: 15/754,440

(22) PCT Filed: Aug. 26, 2016

(86) PCT No.: PCT/US2016/048893
§ 371 (c)(1),
(2) Date: Feb. 22, 2018

(87) PCT Pub. No.: WO2017/040248
PCT Pub. Date: Mar. 9, 2017

(65) Prior Publication Data
US 2018/0236551 A1    Aug. 23, 2018

Related U.S. Application Data

(60) Provisional application No. 62/211,546, filed on Aug. 28, 2015.

(51) Int. Cl.
*B29C 64/245* (2017.01)
*B22F 3/105* (2006.01)
(Continued)

(52) U.S. Cl.
CPC ............ *B22F 3/1055* (2013.01); *G06F 30/00* (2020.01); *B22F 2003/1058* (2013.01);
(Continued)

(58) Field of Classification Search
CPC ..... B29C 64/245; B29C 64/393; B33Y 40/00; B33Y 70/00; G05B 19/499; A61F 2/30942; G06F 30/13
See application file for complete search history.

(56) References Cited

U.S. PATENT DOCUMENTS 10,471,665 B1 * 11/2019 Marshall, Jr. ......... B29C 64/393
2002/0171177 A1 * 11/2002 Kritchman ............ B33Y 40/00
264/401
(Continued)

FOREIGN PATENT DOCUMENTS

WO    2014174090 A2    10/2014
WO    2015040410 A2    3/2015

OTHER PUBLICATIONS

International Search Report and Written Opinion dated Jan. 24, 2017 in Application No. PCT/US2016/048893.

*Primary Examiner* — Kandasamy Thangavelu
(74) *Attorney, Agent, or Firm* — Patterson + Sheridan, LLP

(57) ABSTRACT

A system and method for modifying features in designs of objects to make them physically capable of being manufactured using additive manufacturing techniques and machines is provided, carrying out the following steps: Determine if one or more surfaces of the object have a surface angle below a threshold angle; designate one or more edges including a first edge, the first edge being between a first surface of the one or more surfaces and a second surface of the one or more surfaces, wherein the first surface has a surface angle below the threshold angle and the second surface has a surface angle equal to or above the threshold angle; and generate one or more additional surfaces along the one or more edges in the design file.

10 Claims, 8 Drawing Sheets

(51) Int. Cl.
  *G06F 30/00* (2020.01)
  *B33Y 50/00* (2015.01)
  *B29C 64/386* (2017.01)
  *G06F 119/18* (2020.01)
(52) U.S. Cl.
  CPC ............ *B29C 64/386* (2017.08); *B33Y 50/00* (2014.12); *G06F 2119/18* (2020.01); *Y02P 10/295* (2015.11); *Y02P 90/265* (2015.11)

(56) References Cited

U.S. PATENT DOCUMENTS

| | | | |
|---|---|---|---|
| 2004/0187714 A1* | 9/2004 | Napadensky | B33Y 70/00 101/35 |
| 2013/0307193 A1* | 11/2013 | Johnson | B29C 64/245 264/401 |
| 2014/0086780 A1* | 3/2014 | Miller | A61F 2/30942 419/1 |
| 2015/0151492 A1 | 6/2015 | Schmidt | |
| 2017/0076258 A1* | 3/2017 | Grivetti | G06F 30/13 |
| 2018/0052433 A1* | 2/2018 | Vernon | G05B 19/4099 |

* cited by examiner

SELF SUPPORTING IN ADDITIVE MANUFACTURING

CROSS-REFERENCE(S)

This application claims the benefit of and priority to U.S. Provisional Patent Application No. 62/211,546, the entire contents of which are hereby incorporated by reference.

BACKGROUND OF THE INVENTION

The present application relates generally to additive manufacturing (e.g., three-dimensional printing) techniques. In particular, this application relates to automated design of self-supporting objects for additive manufacturing.

Additive manufacturing techniques using an energy source to process raw building materials tend to create thermal and mechanical stresses and strains during the manufacturing process. These stresses and strains may, for example, be caused by the heating and cooling of the raw building materials, which leads to expansion and shrinkage of the material during manufacturing. The stresses and strains on the object, during or after manufacturing can deform the object, or during manufacturing can even prevent the build process from continuing.

In some instances, supports may be used to support the object being manufactured during the manufacturing process. These supports may directly contact the object and may prevent stresses and strains from deforming or distorting the object, act as a heat sink, and/or provide vertical support (e.g., against gravity) to keep the object in a particular position. However, addition of these supports may increase the time and cost of manufacturing due to the extra material needed for supports, extra time needed to place supports in the design of the object, and extra post-processing necessary to remove the supports.

Accordingly, there is a need for improved techniques to support objects during additive manufacturing.

SUMMARY

In one embodiment, a system for additive manufacturing is provided. The system comprises a computer control system comprising one or more computers having a memory and a processor. The computer control system is configured to determine if one or more surfaces of the object have a surface angle below a threshold angle. The computer control system is further configured to designate one or more edges including a first edge, the first edge being between a first surface of the one or more surfaces and a second surface of the one or more surfaces, wherein the first surface has a surface angle below the threshold angle and the second surface has a surface angle equal to or above the threshold angle. One or more additional surfaces are then generated along the one or more edges in the design file.

DETAILED DESCRIPTION OF CERTAIN INVENTIVE EMBODIMENTS

Figure 1:
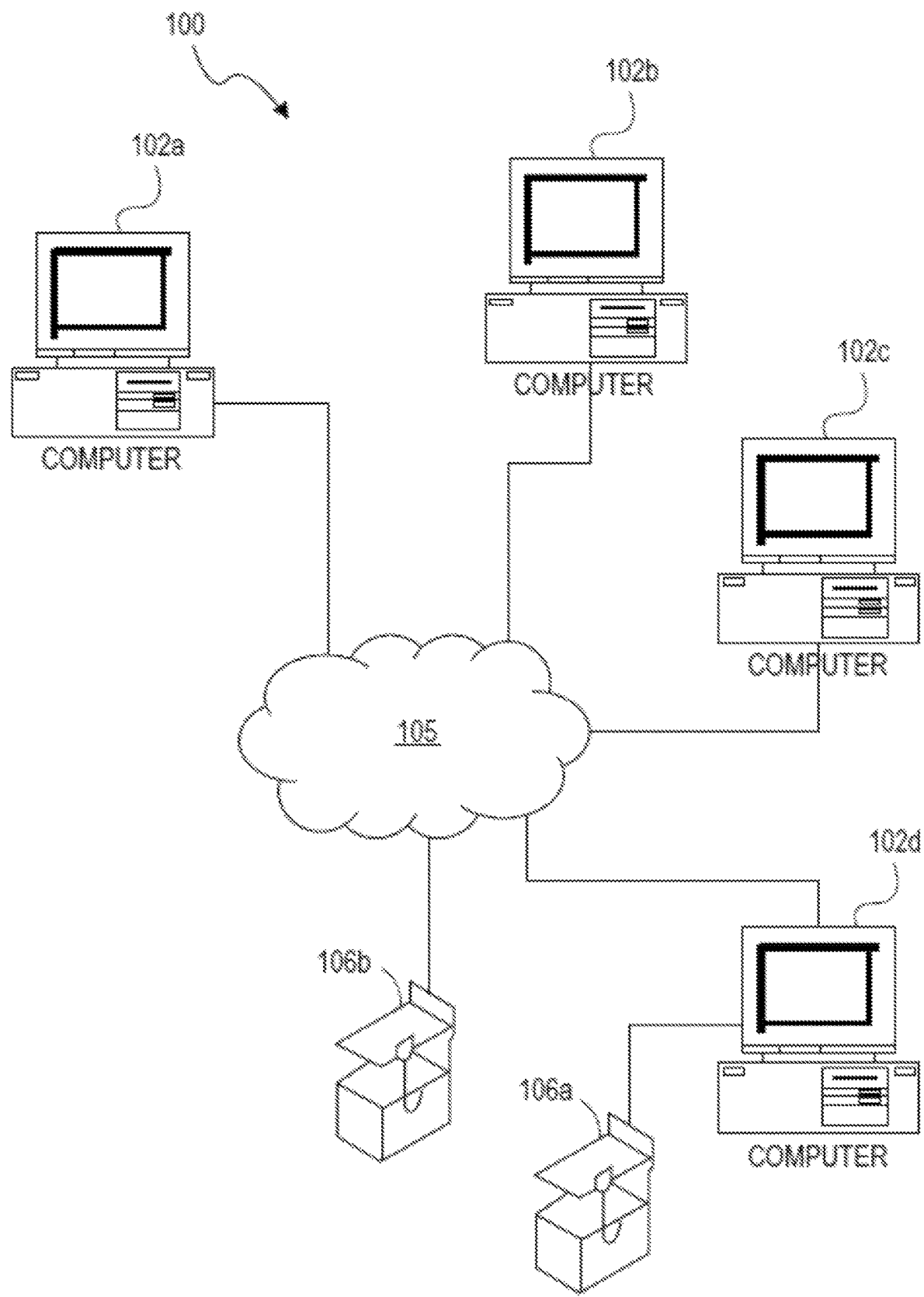
FIG. 1 is an example of a system for designing and manufacturing 3D objects.

The following description and the accompanying figures are directed to certain specific embodiments. The embodiments described in any particular context are not intended to limit this disclosure to the specified embodiment or to any particular usage. Those of skill in the art will recognize that the disclosed embodiments, aspects, and/or features are not limited to any particular embodiments.

The systems and methods described herein may be performed using various additive manufacturing and/or three-dimensional (3D) printing systems and techniques. Typically, additive manufacturing techniques start from a digital representation of the 3D object to be formed. Generally, the digital representation is divided into a series of cross-sectional layers, or "slices," which are overlaid to form the object as a whole. The layers represent the 3D object, and may be generated using additive manufacturing modeling software executed by a computing device. For example, the software may include computer aided design and manufacturing (CAD/CAM) software. Information about the cross-sectional layers of the 3D object may be stored as cross-sectional data. An additive manufacturing (e.g., 3D printing) machine or system utilizes the cross-sectional data for the purpose of building the 3D object on a layer by layer basis. Accordingly, additive manufacturing allows for fabrication of 3D objects directly from computer generated data of the objects, such as computer aided design (CAD) files and in particular STL files. Additive manufacturing provides the ability to quickly manufacture both simple and complex parts without tooling and without the need for assembly of different parts.

Stereolithography (SLA) is an additive manufacturing technique used for "printing" 3D objects one layer at a time. An SLA apparatus may employ, for example, a laser to cure a photo-reactive substance with emitted radiation. In some embodiments, the SLA apparatus directs the laser across a surface of a photo-reactive substance, such as, for example, a curable photopolymer ("resin"), in order to build an object one layer at a time. For each layer, the laser beam traces a cross-section of the object on the surface of the liquid resin, which cures and solidifies the cross-section and joins it to the layer below. After a layer has been completed, the SLA apparatus lowers a manufacturing platform by a distance equal to the thickness of a single layer and then deposits a new surface of uncured resin (or like photo-reactive material) on the previous layer. On this surface, a new pattern is traced thereby forming a new layer. By repeating this process one layer at a time, a complete 3D part may be formed.

Selective laser sintering (LS) is another additive manufacturing technique used for 3D printing objects. LS apparatuses often use a high-powered laser (e.g. a carbon dioxide laser) to "sinter" (i.e. fuse) small particles of plastic, metal, ceramic, or glass powders into a 3D object. Similar to SLA, the LS apparatus may use a laser to scan cross-sections on the surface of a powder bed in accordance with a CAD design. Also similar to SLA, the LS apparatus may lower a manufacturing platform by one layer thickness after a layer has been completed and add a new layer of material in order that a new layer can be formed. In some embodiments, an LS apparatus may preheat the powder in order to make it easier for the laser to raise the temperature during the sintering process.

Selective Laser Melting (LM) is yet another additive manufacturing technique used for 3D printing objects. Like LS, an LM apparatus typically uses a high-powered laser to selectively melt thin layers of metal powder to form solid metal objects. While similar, LM differs from LS because it typically uses materials with much higher melting points. When constructing objects using LM, thin layers of metal powder may be distributed using various coating mechanisms. Like SLA and LS, a manufacturing surface moves up and down to allow layers to be formed individually.

Fused Deposition Modeling (FDM) is another additive manufacturing technique wherein a 3D object is produced by extruding small beads of, for example, thermoplastic material from an extrusion nozzle to form layers. In a typical arrangement, the extrusion nozzle is heated to melt the raw material as it is extruded. The raw material then hardens immediately after extrusion from a nozzle. The extrusion nozzle can be moved in one or more dimensions by way of appropriate machinery. Similar to the aforementioned additive manufacturing techniques, the extrusion nozzle follows a path controlled by CAD or CAM software. Also similar, the part is built from the bottom up, one layer at a time.

Electron beam melting (EBM) and direct metal laser sintering (DMLS) are other examples of additive manufacturing techniques for 3D printing objects.

Objects may be formed by additive manufacturing apparatuses using various materials, such as (but not limited to): polypropylene, thermoplastic polyurethane, polyurethane, acrylonitrile butadiene styrene (ABS), polycarbonate (PC), PC-ABS, PLA, polystyrene, lignin, polyamide, polyamide with additives such as glass or metal particles, methyl methacrylate-acrylonitrile-butadiene-styrene copolymer, resorbable materials such as polymer-ceramic composites, and other similar suitable materials. In some embodiments, commercially available materials may be utilized. These materials may include: DSM Somos® series of materials 7100, 8100, 9100, 9420, 10100, 11100, 12110, 14120 and 15100 from DSM Somos; ABSplus-P430, ABSi, ABS-ESDI, ABS-M30, ABS-M30i, PC-ABS, PC-ISO, PC, ULTEM 9085, PPSF and PPSU materials from Stratasys; Accura Plastic, DuraForm, CastForm, Laserform and VisiJet line of materials from 3-Systems; Aluminium, CobaltChrome and Stainless Steel materials; Maranging Steel; Nickel Alloy; Titanium; the PA line of materials, PrimeCast and PrimePart materials and Alumide and CarbonMide from EOS GmbH.

Objects formed using the additive manufacturing techniques described above have a tendency to distort from the designed dimensions of the object due to, for example, high stresses and/or strains that occur during the manufacturing of the 3D object. For example, thermal and/or mechanical stresses and/or strains may occur during an LM process due to a high temperature of an energy source, such as a laser, used in generating the 3D object. More particularly, high temperature gradients may be present due to the melting of the powders used in the LM process, and these high gradients may cause thermal stresses and/or strains on the object during manufacturing. Furthermore, internal mechanical stresses and/or strains may be caused due to properties of the particular material being used. These mechanical stresses and/or strains may include, for example, shrinking or expansion of the material used to form the object as the material is scanned by the energy source.

High stresses and/or strains on the object may cause certain portions of the object to deform during the build, which may result in a failed or "crashed" build, or an inaccurate and/or defective object. For example, a powder coater in an LM machine may hit a deformed portion of an underlying layer of an object being manufactured if that portion bent or curled upward during the processing of any of the layers.

Object supports (also referred to herein as "supports") may be used to keep an object or part of an object in place and to prevent deformations of the object during the build process. Generally an "object support" is a structure that forms a connection between, for example, a base plate, an internal object structure (e.g., another portion of the object), or an external object structure (e.g., another object being manufactured during the same build process as the object), and the object being manufactured. Object supports may be virtually any shape and size that can be manufactured along with the object. And a given object may be supported during additive manufacturing by a variety of different shapes and sizes of object supports based on the object design and the selected additive manufacturing process. For example, U.S. Provisional Patent Application 61/816,313 and PCT Patent Application No. PCT/EP2014/058484, the contents of each of which are incorporated by reference herein in their entirety, describe the use of "hybrid supports" that can be used during additive manufacturing processes.

Object supports may improve the accuracy of the resulting object after additive manufacturing by constraining each layer to its designed dimensions. Additionally, object supports may conduct heat away from the object layer and into a support structure and/or base plate in order to reduce thermal stresses and strains caused by the additive manufacturing process.

However, addition of such supports in the manufacturing of the object, requires additional material to be used to build the support and requires the supports to be removed from the object. The process for removing the supports can be time consuming and difficult. In particular, comparative processes to those described herein for removing the supports include using a pincer, hammer and chisel to break the supports from the object. Such breaking of the supports may require a large force applied to the support from the pincer, hammer and chisel and also require precision.

Accordingly, systems and methods disclosed herein may eliminate some or all of the supports needed for manufacturing an object by modifying the design of the object to be manufactured using additive manufacturing techniques and machines. In particular, the design of the object may be modified to be self-supporting, and not require additional supports. In some embodiments, a wall thickness of portions of the object in the design may be selectively modified to ensure that the object is self-supporting. For example, systems and methods disclosed herein may ensure that the wall thickness of each surface of an object in a design file (e.g., STL file) is above a minimum thickness threshold. For any surfaces that are determined to be below the threshold, the design file may be modified such that any surfaces below the threshold are set at the minimum thickness threshold.

Further, the systems and methods disclosed herein may determine for each surface (e.g, a triangle of an STL file) that describes the object, whether a surface angle of the surface indicates the surface at that point is self-supporting or not (e.g., whether the surface angle is above a minimum surface angle threshold to be self-supporting). The surface angle for a surface, as is known in the art, may be calculated as the angle between the normal from the plane of the surface, and the normal from the build surface the object is to be built on. For any surfaces that are determined to have a surface angle below the minimum surface angle threshold, and thus are not self-supporting, the design file may be modified such that any surface that is not self-supporting is connected to a surface that is self-supporting. The connection may be formed by connecting an edge (e.g., line) between the not self-supporting surface and a self-supporting surface on the object and building a surface along that edge. The surface may be built along the edge using a marching cubes algorithm, in some embodiments, or other suitable methods. Further, the self-supporting surface chosen, may be chosen based upon some criteria such as minimizing the volume that an edge between the not self-supporting surface and the self-supporting surface would add with a surface built along the edge.

In some cases, adding edges for each non-self-supporting surface to a self-supporting surface according to a given criteria may result in sub-optimal choice of edges upon which surfaces are built for the objects. Accordingly, systems and methods herein may further adjust the chosen edges before surfaces are built along the edges for the object. For example, if in a given area of the object, most edges are going in one direction, but there are one or more edges going in the opposite direction, the one or more edges in the opposite direction may be redirected to go in the same direction as the other edges, and associated with a different self-supporting surface accordingly. For example, if a certain percentage (e.g., above a percentage threshold) of edges in a given area all go in one direction, any edges that go in the opposite direction may be redirected in the one direction. Additionally, any edges that do not fit within the surface, or edges that have no other edges (or not a minimum number of additional edges) within a threshold distance may be removed.

A skilled artisan will appreciate that the systems and methods described herein to make designs self-supporting may be used during any number of portions of the design process. For example, the systems and methods may be implemented during a hollowing process of design of an object, during perforation of the object, or during any other suitable process or operation.

Though some embodiments described herein are described with respect to stereolithography techniques using resin as a building material, the described system and methods may also be used with certain other additive manufacturing techniques and/or certain other building materials as would be understood by one of skill in the art.

Embodiments of the invention may be practiced within a system for designing and manufacturing 3D objects. Turning to FIG. 1, an example of a computer environment suitable for the implementation of 3D object design and manufacturing is shown. The environment includes a system 100. The system 100 includes one or more computers 102a-102d, which can be, for example, any workstation, server, or other computing device capable of processing information. In some aspects, each of the computers 102a-102d can be connected, by any suitable communications technology (e.g., an internet protocol), to a network 105 (e.g., the Internet). Accordingly, the computers 102a-102d may transmit and receive information (e.g., software, digital representations of 3-D objects, commands or instructions to operate an additive manufacturing device, etc.) between each other via the network 105.

The system 100 further includes one or more additive manufacturing devices (e.g., 3-D printers) 106a-106b. As shown the additive manufacturing device 106a is directly connected to a computer 102d (and through computer 102d connected to computers 102a-102c via the network 105) and additive manufacturing device 106b is connected to the computers 102a-102d via the network 105. Accordingly, one of skill in the art will understand that an additive manufacturing device 106 may be directly connected to a computer 102, connected to a computer 102 via a network 105, and/or connected to a computer 102 via another computer 102 and the network 105.

It should be noted that though the system 100 is described with respect to a network and one or more computers, the techniques described herein also apply to a single computer 102, which may be directly connected to an additive manufacturing device 106.

Figure 2:
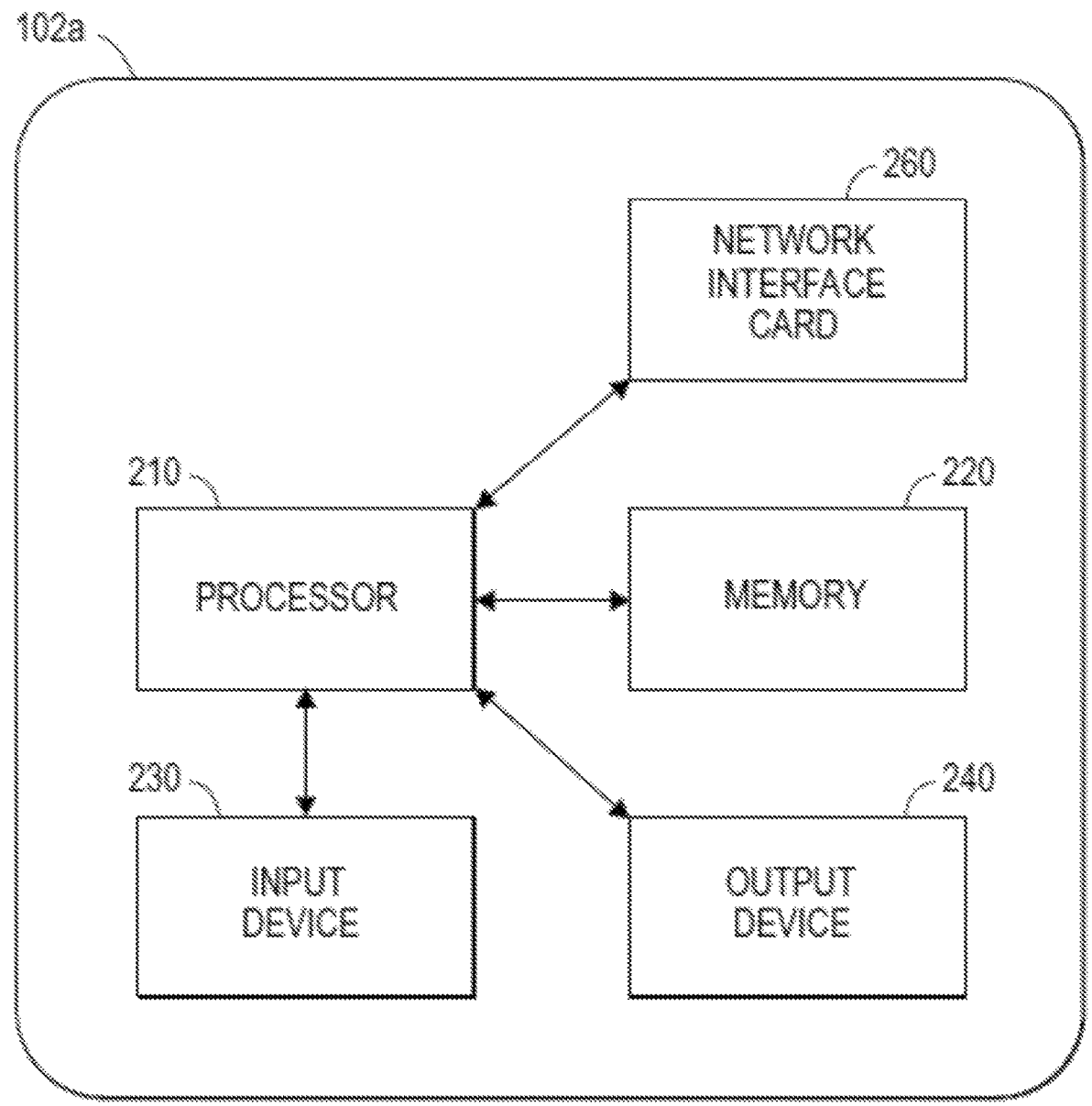
FIG. 2 illustrates a functional block diagram of one example of the computer shown in FIG. 1.

FIG. 2 illustrates a functional block diagram of one example of a computer of FIG. 1. The computer 102a includes a processor 210 in data communication with a memory 220, an input device 230, and an output device 240. In some embodiments, the processor is further in data communication with an optional network interface card 260. Although described separately, it is to be appreciated that functional blocks described with respect to the computer 102a need not be separate structural elements. For example, the processor 210 and memory 220 may be embodied in a single chip.

The processor 210 can be a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration.

The processor 210 can be coupled, via one or more buses, to read information from or write information to memory 220. The processor may additionally, or in the alternative, contain memory, such as processor registers. The memory 220 can include processor cache, including a multi-level hierarchical cache in which different levels have different capacities and access speeds. The memory 220 can also include random access memory (RAM), other volatile storage devices, or non-volatile storage devices. The storage can include hard drives, optical discs, such as compact discs (CDs) or digital video discs (DVDs), flash memory, floppy discs, magnetic tape, and Zip drives.

The processor 210 also may be coupled to an input device 230 and an output device 240 for, respectively, receiving input from and providing output to a user of the computer 102a. Suitable input devices include, but are not limited to, a keyboard, buttons, keys, switches, a pointing device, a mouse, a joystick, a remote control, an infrared detector, a bar code reader, a scanner, a video camera (possibly coupled with video processing software to, e.g., detect hand gestures or facial gestures), a motion detector, or a microphone (possibly coupled to audio processing software to, e.g., detect voice commands). Suitable output devices include, but are not limited to, visual output devices, including displays and printers, audio output devices, including speakers, headphones, earphones, and alarms, additive manufacturing devices, and haptic output devices.

The processor 210 further may be coupled to a network interface card 260. The network interface card 260 prepares data generated by the processor 210 for transmission via a network according to one or more data transmission protocols. The network interface card 260 also decodes data received via a network according to one or more data transmission protocols. The network interface card 260 can include a transmitter, receiver, or both. In other embodiments, the transmitter and receiver can be two separate components. The network interface card 260, can be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein.

Figure 3:
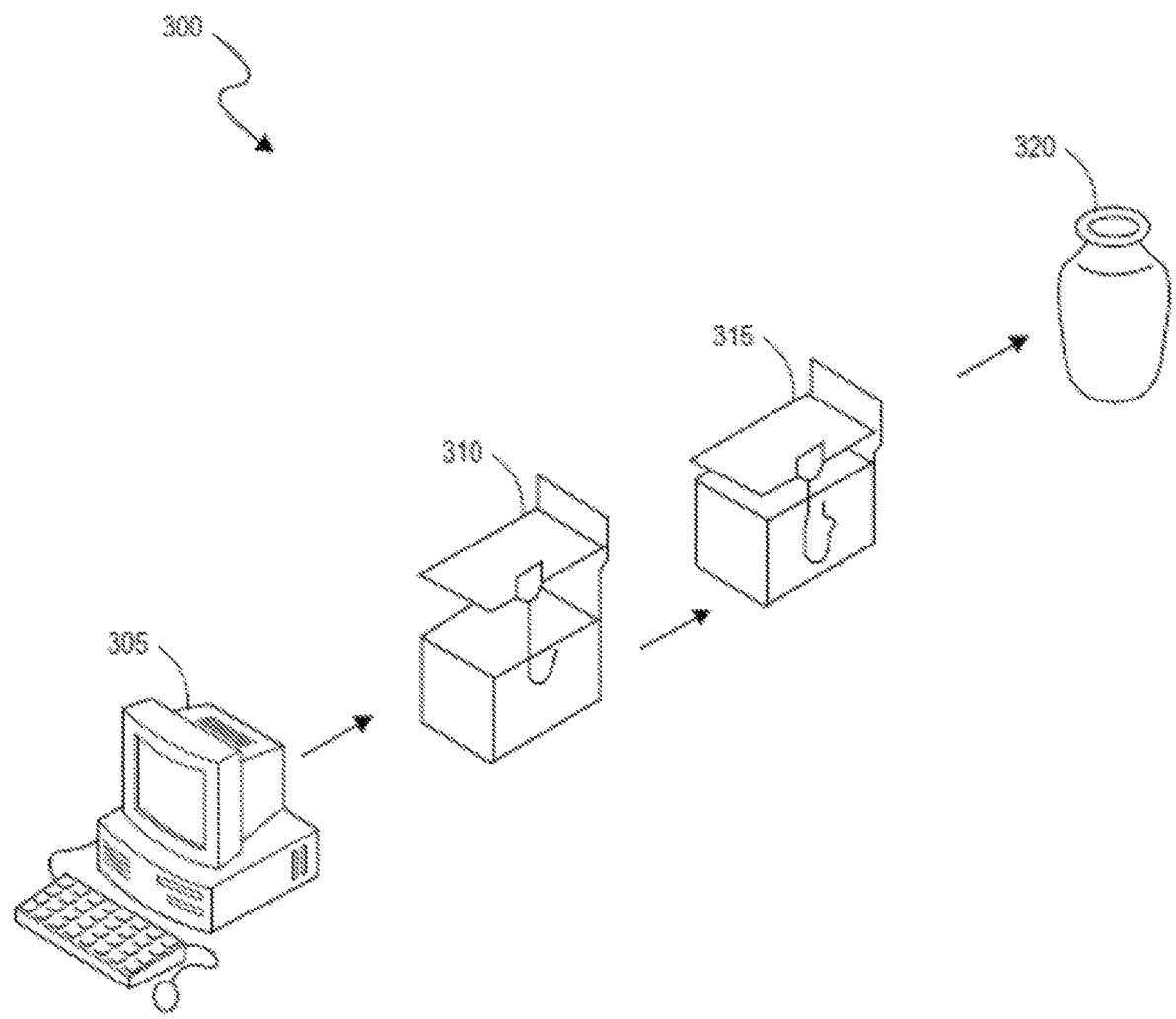
FIG. 3 shows a high level process for manufacturing a 3D object using the system of FIG. 1.

FIG. 3 illustrates a process 300 for manufacturing a 3-D object or device. As shown, at step 305, a digital representation of the object is designed using a computer, such as the computer 102a. For example, 2-D or 3-D data may be input to the computer 102a for aiding in designing the digital representation of the 3-D object. Continuing at step 310, information is sent from the computer 102a to an additive manufacturing device, such as additive manufacturing device 106, and the device 106 commences the manufacturing process in accordance with the received information. At step 315, the additive manufacturing device 106 continues manufacturing the 3-D object using suitable materials, such as a polymer or metal powder. Further, at step 320, the 3-D object is generated.

Figure 4:
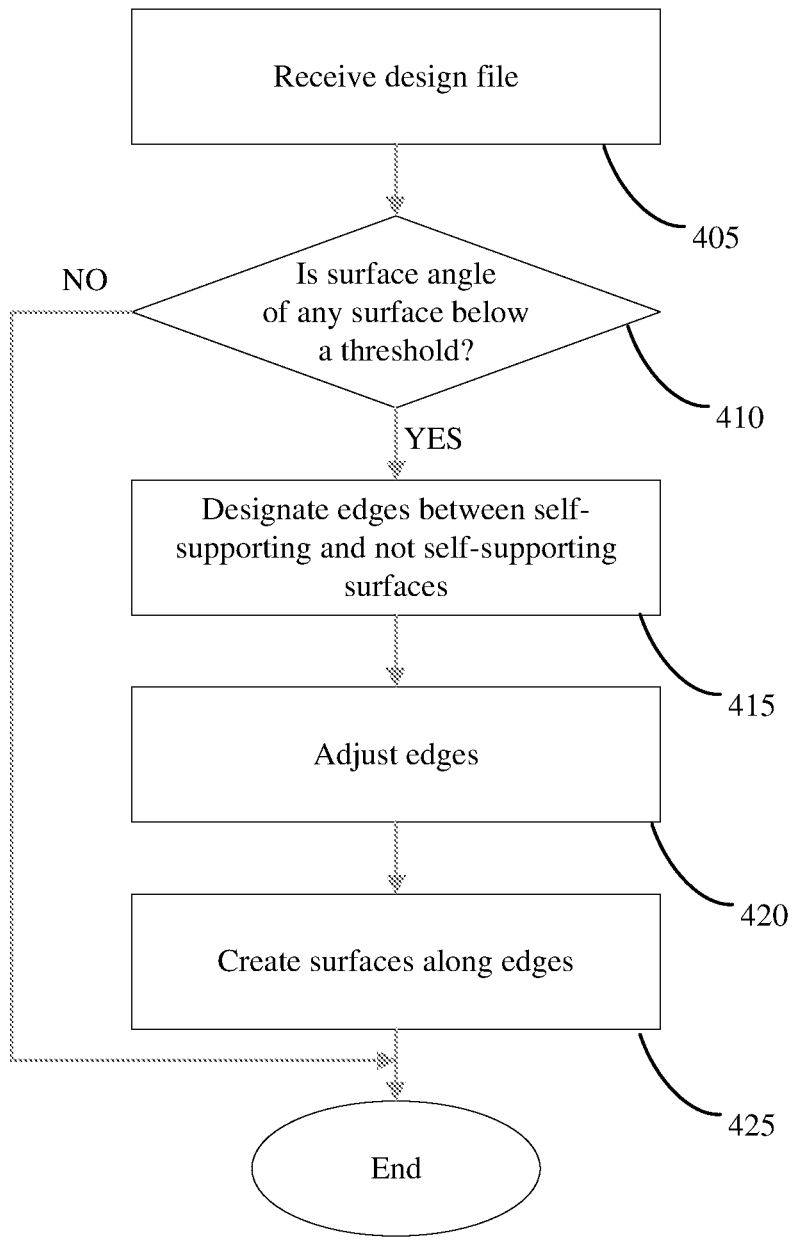
FIG. 4 is a flowchart that illustrates a process by which a computer may modify designs of objects to be manufactured using additive manufacturing.

FIG. 4 illustrates a process by which a computer, such as the computer 102 of FIG. 1, may modify designs of objects to be manufactured using additive manufacturing. The computer 102 may be running software that causes the processor of the computer to perform the steps of the process 400. The process 400 begins at block 405 where the computer 102 receives a design file of an object to be additively manufactured. The design file may be in a STL file format (or another appropriate file format) as is used in the additive manufacturing field. If the design file is not in an appropriate file format, the computer 102 may be configured to convert the design file to a different format using standard software. For example, the computer may include conversion software which converts a CAD file to a STL file.

Figure 5A:
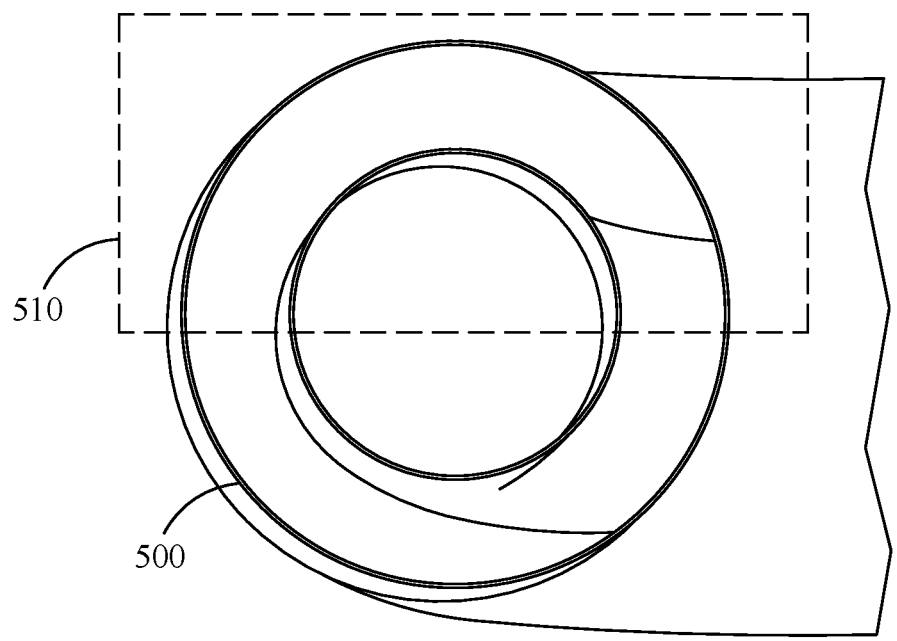
FIG. 5A illustrates an example of an object.

Continuing, at block 410, the computer 102 may be configured to review the design file (e.g., on a surface by surface or triangle by triangle basis) for any surfaces that have a surface angle below a threshold surface angle. If at block 410, no surfaces have a surface angle below the threshold surface angle, the process may end. If at block 410, one or more surfaces have a surface angle below the threshold, the process may continue to block 415. For example, as shown in FIG. 5A, surfaces on the object 500, within box 510, have surfaces angle below a threshold. The remaining surfaces of the object 500 are determined to be self-supporting.

Figure 5B:
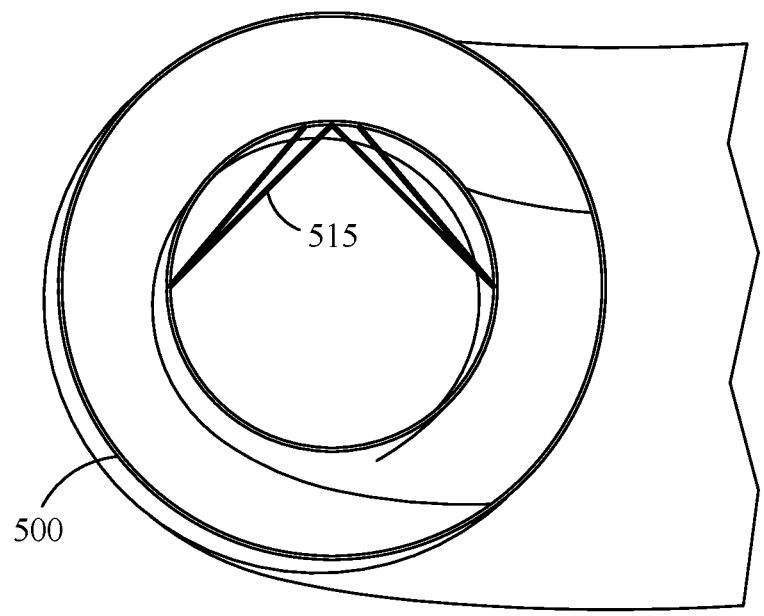
FIG. 5B illustrates an example of the object of FIG. 5A with edges added.

Further, at block 415, the computer 102, for any surfaces that have a surface angle below the threshold (and therefore are determined to be not self-supporting surfaces) an edge is designated between the not self-supporting surface and a surface that is determined to be self-supporting to connect the surfaces. In some embodiments, the self-supporting surface chosen to connect to a particular not self-supporting surface is chosen according to a criteria. In some embodiments, the criteria may include factors which minimize the volume that an edge would add between the not self-supporting surface and the self-supporting surface chosen from among the self-supporting surfaces. For example, the closest self-supporting surface to the not self-supporting surface by distance may be chosen. For example, as shown in FIG. 5B, edges 515 are drawn between not self-supporting surfaces and self-supporting surfaces.

Figure 6:
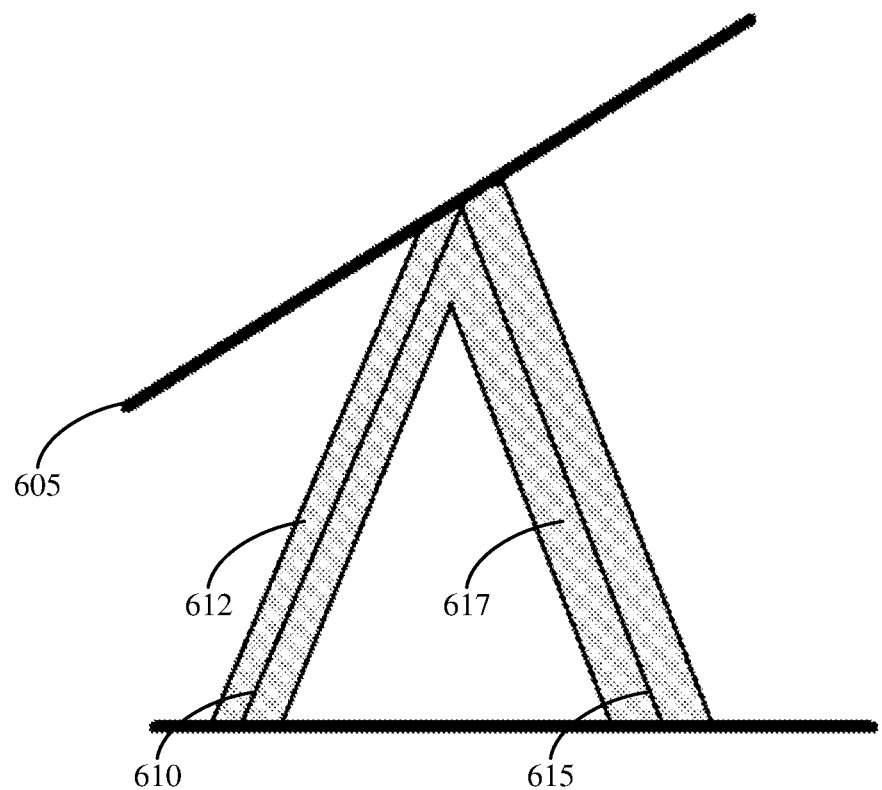
FIG. 6 illustrates an example of the volume difference between supports built along different edges of an object.

Further, FIG. 6 illustrates how the volume an edge would add can be different based on the edge chosen to build a support along. As shown, line 605 represents the surface of an object that is not self-supporting. Each of lines 610 and 615 represent potential edges along which the supports may be built. As shown, edge 610 is more in the same general direction as the surface 605 than the edge 615, or in other words, the angle between the surface 605 and the edge 610 is less than the angle between the surface 605 and the edge 615. Further, when a support is built along an edge, it may contact the surface along a fixed or selected surface area. Accordingly, if the same surface area of contact of the support to the surface 605 is used for building support along each of edges 610 and 615, the volume of a support 612 built along the edge 610 is less than the volume of a support 617 built along the edge 615, due to the difference in angles as shown. Therefore, in some embodiments, minimizing the volume that an edge would add may be based on selecting an edge that is in the same general direction as or minimizes an angle with respect to the surface that is not self-supporting.

Returning now to FIG. 4, at optional block 420, the chosen edges are adjusted. For example, for each edge, the computer 102 may determine if in a given volume of the object surrounding the edge, a percentage of the edges move in one general direction, and if that percentage is above a threshold value. If the percentage is above a threshold value, and if the given edge is moving in a generally opposite direction as the edges that move in the one general direction, the given edge may be designated to go in the same direction as the other edges, and associated with a different self-supporting surface accordingly. Additionally or alternatively, any edges that do not fit within the surface may be removed. Additionally or alternatively, for each edge, the computer 102 may determine if in a given volume of the object surrounding the edge, there are a minimum number of additional edges, and if there are not a minimum number of additional edges, the given edge may be removed.

Figure 5C:
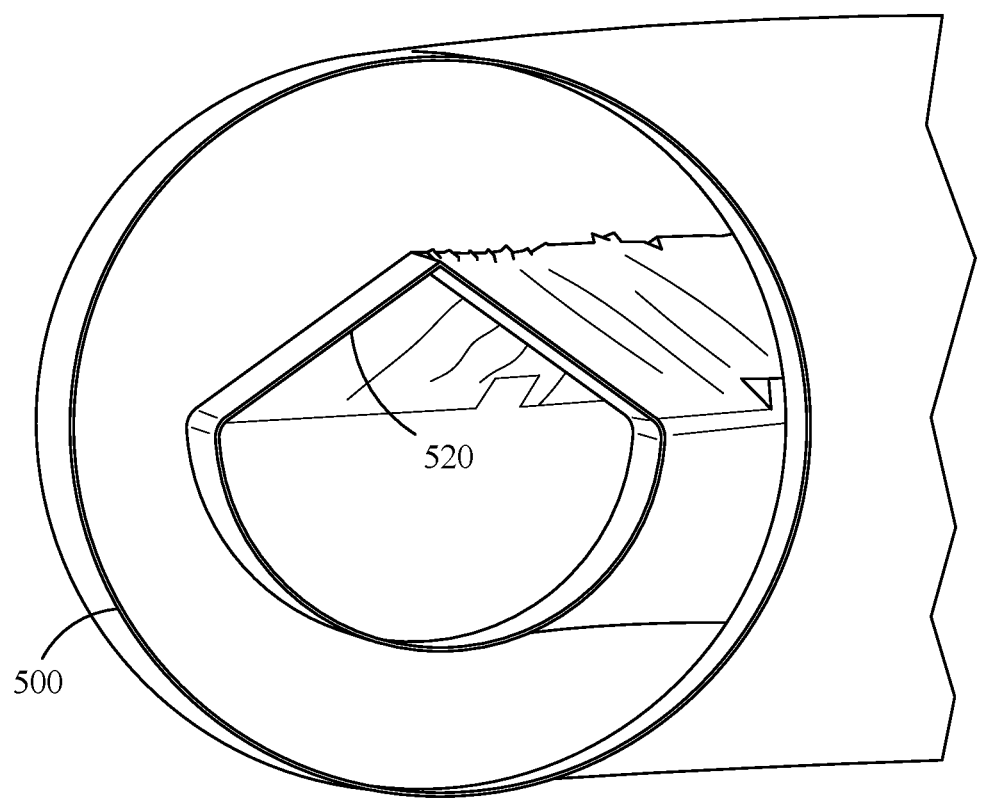
FIG. 5C illustrates an example of the object of FIG. 5B with surfaces added along the edges.

Further, at block 425, a surface is created on each of the edges. For example, the surface may be created using a marching cubes algorithm. In other embodiments, other techniques for creating surfaces on edges may be used. For example, analytical cylinders or cones may be created along the edges and then turned into triangle models and united using Boolean operations. In yet other embodiments, non-uniform rational basis spline (NURBS) surfaces may be used. Accordingly, the design of the object may now be self-supporting and additional supports are not needed. For example, FIG. 5C illustrates the object 500 as modified with additional surfaces 520 to be self-supporting.

After the process ends, the design may be manufactured using additive manufacturing techniques such as those described herein.

Figure 7:
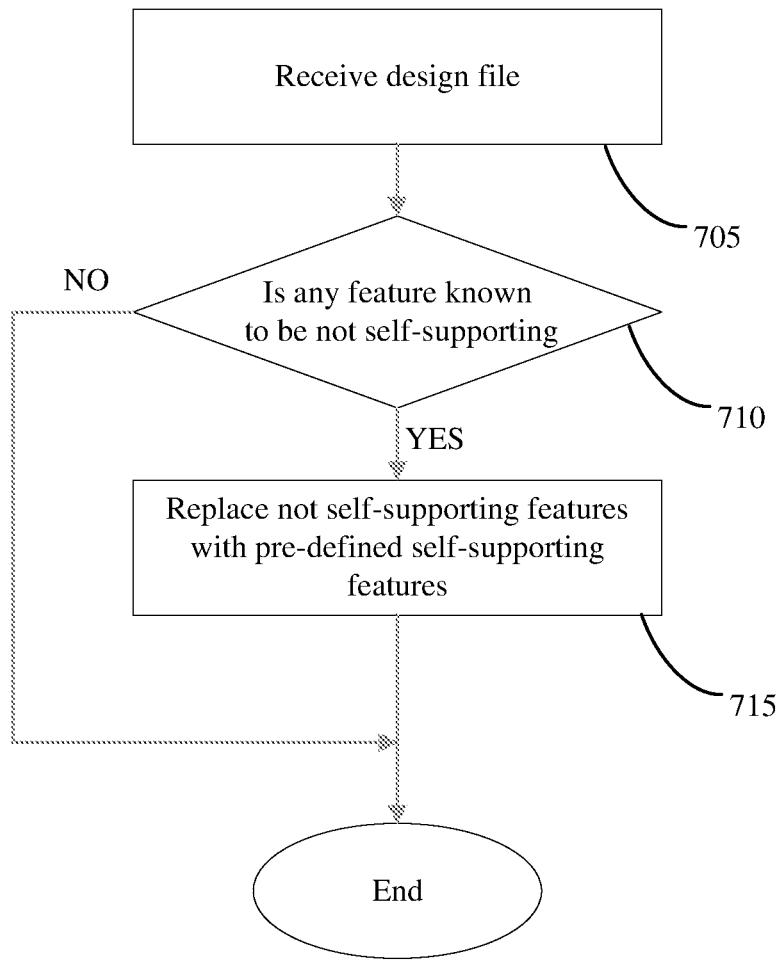
FIG. 7 is a flowchart that illustrates another process by which a computer may modify designs of objects to be manufactured using additive manufacturing.

FIG. 7 illustrates another process by which a computer, such as the computer 102 of FIG. 1, may modify designs of objects to be manufactured using additive manufacturing. The process 700 may be used additionally or alternatively to process 400, as would be understood by one of skill in the art. For example, process 700 may be used to modify designs of objects, first, and then process 400 used to make additional modifications.

The process 700 begins at block 705 where the computer 102 receives a design file of an object to be additively manufactured. The design file may be in a STL file format (or another appropriate file format) as is used in the additive manufacturing field. If the design file is not in an appropriate file format, the computer 102 may convert the design file to a different format using standard software (e.g., converting a CAD file to a STL file).

Continuing, at block 710, the computer 102 may be configured to review the design file (e.g., using known imaging or feature recognition techniques) for any features of the object (e.g., circular holes, etc., generally or above a threshold size/diameter) that are known/pre-defined to be not self-supporting. If at block 710, it is determined no features of the object are known to be not self-supporting, the process may end. If at block 710, one or more features are known to be not self-supporting, the process may continue to block 715. For example, a circular hole in the object (e.g., above a threshold size) may be determined as a feature that is not self-supporting.

At block 715, any features that are determined as not self-supporting are replaced with a corresponding pre-defined self-supporting feature. For example, a circular hole, as shown in FIG. 5A, may be replaced with a droplet shaped hole, as shown in FIG. 5C. The computer 102 may include a library and/or database of features that are known to be not self-supporting and corresponding features that are self-supporting to replace such not self-supporting features. The library may include general shape information of such features and replacement, and the computer 102 may be capable of scaling or transforming the features and replacement information stored to conform to the object of the design file. After the process ends, the design may be manufactured using additive manufacturing techniques such as those described herein.

Various embodiments disclosed herein provide for the use of a computer control system. A skilled artisan will readily appreciate that these embodiments may be implemented using numerous different types of computing devices, including both general purpose and/or special purpose computing system environments or configurations. Examples of well-known computing systems, environments, and/or configurations that may be suitable for use in connection with the embodiments set forth above may include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like. These devices may include stored instructions, which, when executed by a microprocessor in the computing device, cause the computer device to perform specified actions to carry out the instructions. As used herein, instructions refer to computer-implemented steps for processing information in the system. Instructions can be implemented in software, firmware or hardware and include any type of programmed step undertaken by components of the system.

A microprocessor may be any conventional general purpose single- or multi-chip microprocessor such as a Pentium® processor, a Pentium® Pro processor, a 8051 processor, a MIPS® processor, a Power PC® processor, or an Alpha® processor. In addition, the microprocessor may be any conventional special purpose microprocessor such as a digital signal processor or a graphics processor. The microprocessor typically has conventional address lines, conventional data lines, and one or more conventional control lines.

Aspects and embodiments of the inventions disclosed herein may be implemented as a method, apparatus or article of manufacture using standard programming or engineering techniques to produce software, firmware, hardware, or any combination thereof. The term "article of manufacture" as used herein refers to code or logic implemented in hardware or non-transitory computer readable media such as optical storage devices, and volatile or non-volatile memory devices or transitory computer readable media such as signals, carrier waves, etc. Such hardware may include, but is not limited to, field programmable gate arrays (FPGAs), application-specific integrated circuits (ASICs), complex programmable logic devices (CPLDs), programmable logic arrays (PLAs), microprocessors, or other similar processing devices.

What is claimed is:

1. A system for modifying a design file of an object for additive manufacturing, comprising:
    a computer control system comprising one or more computers having a memory and a processor, the computer control system configured to:
    receive the design file of the object for additive manufacturing, the object comprising a plurality of surfaces and store the received design file in the computer memory;
    determine if one or more surfaces of the object are not self-supporting surfaces by determining that a surface angle of the surface is below a threshold angle, wherein the surface angle is calculated as the angle between a normal from a plane of the surface, and a normal from a build surface the object is to be built on;
    add one or more edges including a first edge in the design file, the first edge being between a first surface of the one or more surfaces and a second surface of the one or more surfaces, wherein the first surface has a surface angle below the threshold angle and the second surface has a surface angle equal to or above the threshold angle;
    generate one or more additional surfaces along the one or more edges in the design file, wherein the one or more additional surfaces are self-supporting, so that the design of the object is modified to be self-supporting; and
    store the additional surfaces in the design file.

2. The system of claim 1, wherein the computer control system is further configured to modify a wall thickness of one or more portions of the object in the design file based on a minimum wall thickness threshold.

3. The system of claim 1, wherein adding the first edge comprises selecting the second surface based on the position of the first surface and a criterion.

4. The system of claim 3, wherein the criterion comprises minimization of a volume which the surface is generated along the first edge adds to the object.

5. The system of claim 1, wherein the one or more additional surfaces are generated using a marching cubes algorithm.

6. The system of claim 1, wherein the computer control system is further configured to determine if the first edge fits within the object, and if the edge does not fit within the object, the computer control system is configured to remove the first edge.

7. The system of claim 1, wherein the computer control system is further configured to determine if the first edge is within a threshold distance of another edge, and if the first edge is not within the threshold distance of another edge, the computer control system is configured to remove the edge.

8. The system of claim 1, wherein the computer control system is further configured to determine if the first edge is in an opposite direction as a plurality of neighboring edges, and if the first edge is in the opposite direction as the plurality of neighboring edges, the computer control system is configured to change the edge to be in the same direction as the plurality of neighboring edges.

9. A method of modifying design of an object to be self-supporting in additive manufacturing, the method comprising:
   receiving a design file of the object for additive manufacturing, the object comprising a plurality of surfaces and storing the received design file in a computer memory;
   identifying one or more surfaces in the design file that are not self-supporting surfaces by determining that a surface has a surface angle below a threshold, wherein the surface angle is calculated as the angle between a normal from a plane of the surface, and a normal from a build surface the object is being built on;
   adding one or more edges including a first edge in the design file, the first edge being between a first surface of the one or more surfaces and a second surface of the object, wherein the first surface has a surface angle below the threshold angle and the second surface has a surface angle equal to or above the threshold angle;
   generating one or more additional surfaces along the one or more added edges in the design file, wherein the one or more additional surfaces are self-supporting, and storing the additional surfaces in the design file, so that the design of the object is modified to be self-supporting.

10. The method of claim 9, further comprising:
identifying a feature in the stored design file that is not self-supporting; and
modifying the design file by replacing the identified feature with a pre-defined self-supporting feature.

* * * * *